July 25, 1939.  B. ULINSKI  2,167,224
POWER STEERING MECHANISM
Filed May 21, 1937  2 Sheets-Sheet 1
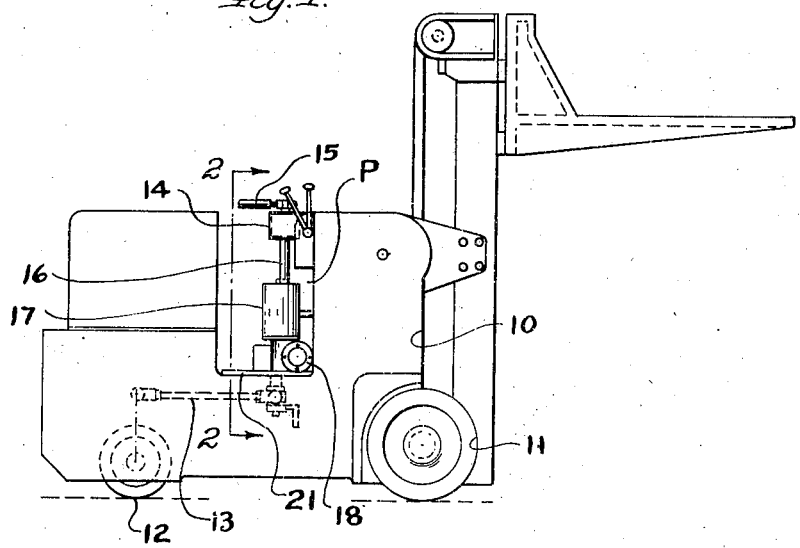
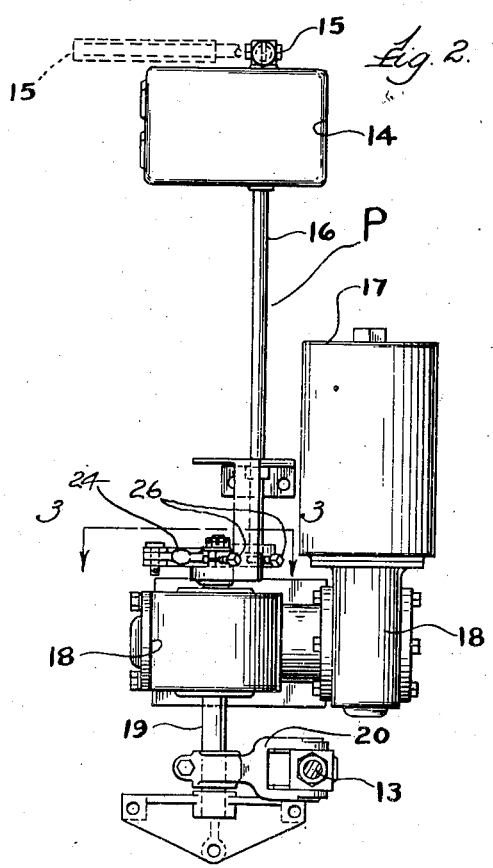
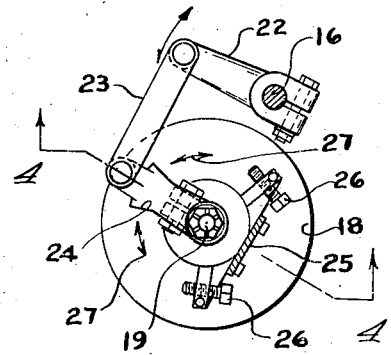
Inventor
B Ulinski
by A H Golden
Attorney

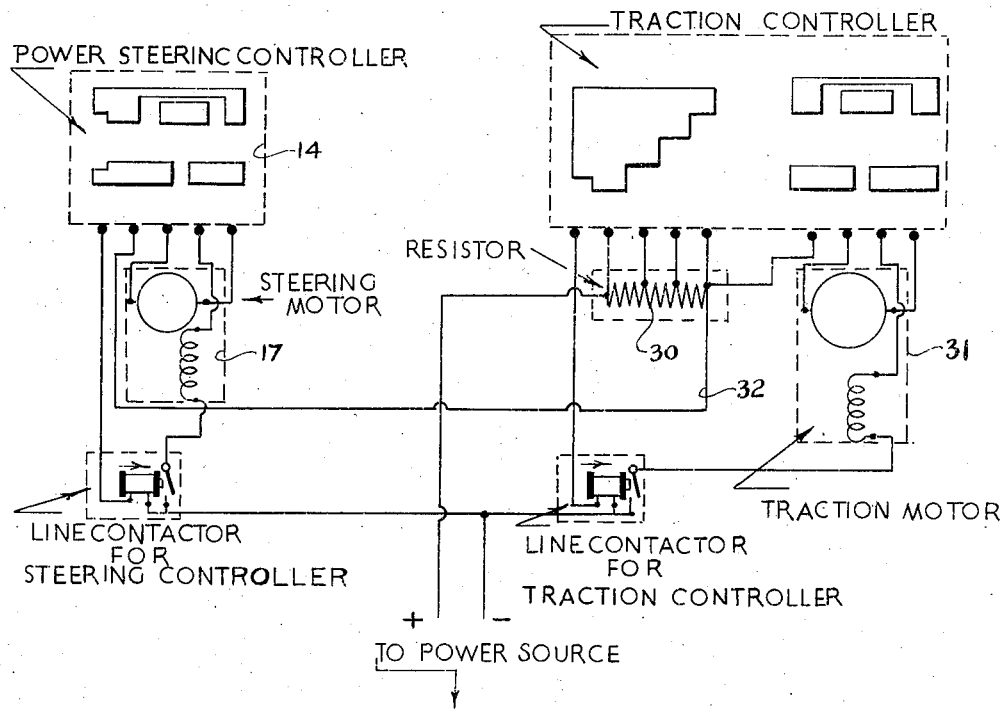

Patented July 25, 1939

2,167,224

UNITED STATES PATENT OFFICE 2,167,224

POWER STEERING MECHANISM

Bronislaus Ulinski, Chicago, Ill., assignor to The Yale & Towne Manufacturing Company, Stamford, Conn., a corporation of Connecticut Application May 21, 1937, Serial No. 143,912

15 Claims. (Cl. 180—79.1)

This invention relates to power steering mechanism for a truck. My power steering mechanism is particularly designed for use on a heavy industrial truck, but it will readily be appreciated that certain features thereof are adapted for use on other types of trucks.

When a truck or other vehicle is steered by hand, the operator is fully aware of the normal resistance encountered in steering. Therefore, when the steering wheels are up against an obstacle so that they cannot be steered properly, he knows by the "feel" of the steering wheel that the wheels are up against an obstacle and he moves the truck so as to take the wheels away from the obstacle. Where a power steer is used, the power is applied to the steering wheels regardless of any obstacle which may be present, to the end that the steering mechanism may be very severely damaged and even entirely destroyed.

My invention provides a power steer in which the power available for steering is diminished to a considerable extent when the truck is standing still, which is the condition under which a serious obstacle to steering is usually encountered. It is very seldom that the truck encounters an obstacle to steering while it is moving, and if so, the very movement of the truck helps it pass over the obstacle.

It is extremely desirable in power steering that the steering mechanism function with considerably greater speed when the truck is moving at a considerable rate of speed, than when it is standing still, as will be readily appreciated. In some prior art devices, the steering mechanism has been operated through gears of differing ratio, and which are shifted coincidentally with the shifting of the speed gears of the particular vehicle to which the steering mechanism is applied. I vary automatically the speed of my power steering mechanism and also the power available when the vehicle is standing still, through a very simple arrangement, which I shall now explain rather generally. Later, in connection with the drawings, I shall describe my invention in greater detail.

In my truck, I utilize a traction motor which has the usual traction resistance controlled by a controller. I utilize a steering motor having its own controller which may be of a very simple type, merely acting to change the direction of operation of the motor, and therefore the steering apparatus. I arrange the circuits of the steering motor and the traction motor so that each includes in its circuit the traction resistance, and so that the amount of resistance in each of the circuits is controlled by the traction controller.

In this way, when my truck is standing still, all of the traction resistance is in the circuit of the steering motor and the power is reduced considerably. As the circuit through the traction motor is closed and more and more traction resistance is shunted out of the said circuit, more and more traction resistance will be shunted out of the circuit of the steering motor and its speed increases. While I prefer to use the traction resistance as a resistance common to both the traction motor and the steering motor, and consider this a real advance in the art, it should be considered that I may use a separate resistance for the steering motor, and vary the said resistance while varying the resistance through the traction motor. I cite this possible adaptation of the principles of my invention to illustrate its many possibilities, and to help in the interpreting of the claims hereinafter set forth.

As a further feature of my invention, I employ a very novel means for breaking the circuit through the steering motor under certain steering conditions. Also, I utilize extremely novel means for mounting the steering motor, its controller and other parts relatively to an industrial truck.

I shall now refer to the drawings wherein Fig. 1 is an elevation of a usual type of industrial truck to which my invention has been applied. Fig. 2 is a view along line 2—2 of Fig. 1 showing the power steering assembly. Fig. 3 is a view along line 3—3 of Fig. 2, while Fig. 4 is a view along line 4—4 of Fig. 3. Fig. 5 is a wiring diagram through the various circuits utilized in my invention.

Referring now more particularly to the drawings, reference numeral 10 indicates the frame of an industrial truck having rear power wheels 11 and forward steering wheels 12 which are steered through a steering rod 13 operated by a power steering assembly denoted generally by the letter P.

In Fig. 2, the power steering assembly P is shown as comprising a controller 14 having a handle 15 through which the shaft 16 may be rotated. The controller 14 controls the electric circuit through the motor 17, whereby the direction of operation of the motor 17 may be controlled. Under certain conditions, it may be that through the controller, I may wish to control the speed of the motor 17 as well as its direction of operation.

The motor 17 operates through a series of gears denoted generally by reference numeral 18, to rotate a shaft 19, which in turn through a suitable connecting link 20 moves the steering rod 13. The mounting of my entire steering mechanism relatively to the platform 21 of the electric truck 10 I consider extremely novel, since the particular arrangement utilized allows for an easy application of the steering rod 13 to the steering wheels 12 while placing the controller 14 and the operating handle 15 in extremely advantageous and desirable positions.

The controller shaft 16 has secured thereto a link 22, which in turn is pivoted so as to actuate a link 23 which is pivoted so as to actuate a link 24 mounted for free rotation about the shaft 19. Secured for rotation with the shaft 19 is a bracket 25 which carries a pair of adjusting bolts 26, as is best seen in Figs. 3 and 4. As the handle 15 is rotated so as to move shaft 16 to position the controller 14 so as to steer in one or the other direction, the link 24 will be moved in the direction of one or the other of the arrows 27. The consequent operation of the steering motor 17 and the gears 18 will cause the bracket 25 and the one or the other of the bolts 26 to then return the link 24 and therefore the shaft 16 to its initial position, corresponding to a neutral position of the controller 14.

This return of the controller shaft 16 to neutral will be accomplished when the motor 17 has moved the steering apparatus to its extreme full steering position in one or the other of its steering directions. I believe that through the mechanism just described, I have obtained an extremely novel and desirable form of means for limiting the degree of movement of the steering motor, and for returning the steering controller to its neutral position.

I shall now refer to Fig. 5 for a description of the electric circuits employed whereby I obtain the results hereinbefore set forth. In Fig. 5, in order that a better understanding of the invention may be had, the various parts are indicated by name as well as by reference numerals.

It will be noted that the current will normally flow from the power source to the resistor and through the traction resistance 30 of the resistor to the traction motor 31. The amount of the resistance 30 which will be in the circuit of the traction motor 31 is determined by the usual traction controller well known in the art, and in a manner which will be understood by those skilled in the art. The steering motor 17 is so arranged that current will flow thereto from the plus side of the power source through the traction resistance 30 of the resistor, thence through the power line 32, through the controller 14 and back to the negative side of the power source.

Since this current through the steering motor must flow through the traction resistance 30, it will be quite obvious that the greater the traction resistance, the greater will be the resistance through the steering motor circuit, so that the power available to the steering motor will be considerably reduced. When all the traction resistance is in the steering motor circuit, the steering motor will have considerably reduced power. As the traction controller is operated to shunt out more and more of the resistance 30 from the traction motor 31, more and more of the resistance will naturally be shunted out of the circuit of the steering motor 17, and the power available to the steering motor 17 will be increased. Therefore, if the traction motor receives more and more current so as to increase the speed of the truck, the steering motor will also receive more and more of the current, so that its speed will be increased also. In this way, I obtain the results hereinbefore described generally.

The line contactor for the steering controller and the line controller for the traction controller shown in the drawings, do not form part of this invention, but are merely shown to illustrate the relation of these parts to the invention. The purpose of the line contactors will be readily appreciated by those skilled in the art.

While I have described generally the operation of my invention and the results obtained therefrom, and have shown and described one specific embodiment of my invention, it should be understood that I do not wish to be limited to the said specific embodiment, but rather, that I feel myself entitled to a relatively broad monopoly under the patent law.

I claim:

1. Power steering mechanism comprising a steering motor, steering mechanism actuated by said motor, a controller for said motor, said controller lying normally in neutral position and movable from said neutral position to condition the circuit of said motor to actuate said steering mechanism in a desired direction, and means of connection between said motor and controller whereby said controller is returned to neutral position when said steering mechanism assumes an extreme steering position.

2. Power steering mechanism for a truck comprising a steering motor, steering mechanism actuated by said motor, a controller for said motor adapted to be positioned for conditioning the circuit of said steering motor whereby to steer said truck in either of opposite directions, means for positioning said controller, mechanism movable with said controller as said controller is positioned, and means actuated by said steering motor for moving said mechanism whereby to return the controller to neutral position when said steering mechanism assumes an extreme steering position.

3. Power steering mechanism for a truck comprising a steering motor, a set of gearing driven by said motor, a horizontal steering shaft movable by said steering motor, a vertical shaft, a controller movable by rotation of said vertical shaft, said controller being adapted to condition the circuit of said steering motor whereby to steer said truck in either of opposite directions, linkage mechanism actuated by rotation of said vertical shaft incidental to the setting of said controller, and means whereby said linkage mechanism is operated by said steering motor to position said controller as said steering mechanism is actuated.

4. In an electric truck, an operator's platform, a vertical control shaft, a horizontally extending handle accessible to an operator standing on said platform, controller mechanism adapted to be positioned as said shaft is rotated by said handle, an electric motor, gearing driven by said motor, steering mechanism actuated through said gearing, and means of connection between said shaft and said gearing whereby said gearing rotates said shaft.

5. In a truck of the class described, a traction motor, a circuit for said motor having a variable traction resistance, a controller for said traction motor circuit to vary the traction resistance, a steering motor, a circuit for said steering motor, said circuit being formed so that when closed it traverses that portion of the traction resistance which is at the time of the closing thereof in the circuit of the traction motor.

6. In a truck of the class described, an electric traction motor, an electric steering motor, and means whereby the power available to said steering motor is substantially reduced when the circuit through the traction motor is open.

7. In a truck of the class described, an electric traction motor, a circuit therefor having a traction resistance, an electric steering motor, a circuit for said steering motor, and means whereby the power available to said steering motor through its circuit is substantially reduced when the circuit through the traction motor is open.

8. In a truck of the class described, an electric traction motor, a circuit therefor having a traction resistance, an electric steering motor, a circuit for said steering motor, the said steering motor circuit including also said traction resistance.

9. In a truck of the class described, an electric traction motor, an electric steering motor, and means whereby the electric power available to said steering motor decreases and increases as the power available to said traction motor decreases and increases.

10. In a truck of the class described, an electric traction motor having a circuit, an electric steering motor having a circuit, a traction resistance common to the electric circuits of each of said motors, and a controller for varying the said traction resistance and for therefore increasing and decreasing simultaneously the power available to said steering motor and to said traction motor.

11. In a truck of the class described, a steering apparatus, an electric steering motor for operating said steering apparatus, a variable resistance for said motor whereby to increase and decrease the electric current supplied thereto, an electric traction apparatus including an electric traction motor, a traction resistance for said electric traction motor, and means for varying the said traction resistance while simultaneously varying the said steering motor resistance.

12. In a truck of the class described, a steering apparatus, an electric steering motor for operating said steering apparatus, a variable resistance for said motor whereby to increase and decrease the electric current supplied thereto, an electric traction apparatus including an electric traction motor, a traction resistance for said electric traction motor, means for varying the said traction resistance while simultaneously varying the said steering motor resistance, and a controller for said steering motor for controlling the directional rotation thereof.

13. In a truck of the class described, an electric traction motor having a circuit, an electric steering motor having a circuit, resistance in the circuits of each of said motors, and a controller for varying the said resistance in the circuits of each of said motors for increasing and decreasing simultaneously the power available to said steering motor and to said traction motor.

14. In a truck of the class described, an electric traction motor having a circuit, an electric steering motor having a circuit, resistance in the circuits of each of said motors, a controller for varying the said resistance in the circuits of each of said motors for increasing and decreasing simultaneously the power available to said steering motor and to said traction motor, and a directional controller for said steering motor circuit.

15. In a truck of the class described, an electric traction motor, a circuit therefor having a traction resistance, an electric steering motor including a predetermined portion of said traction resistance, a controller for varying the said traction resistance by cutting out of the traction motor circuit parts of said resistance, said steering motor circuit including therein that part of the predetermined traction resistance not cut out by said controller, whereby when said traction motor circuit is open, the entire predetermined portion of said resistance is in the steering motor circuit.

BRONISLAUS ULINSKI.